March 22, 1966  J. ROSÁN ETAL  3,241,591
DOME FASTENER WITH FLOATING NUT
Filed July 27, 1964  3 Sheets-Sheet 1

INVENTORS
José Rosán
ROBERT D. WEBER
BY
ATTORNEY

March 22, 1966

J. ROSÁN ETAL

3,241,591

DOME FASTENER WITH FLOATING NUT

Filed July 27, 1964

INVENTOR.
José Rosán
ROBERT D. WEBER

BY

ATTORNEY

United States Patent Office 3,241,591
Patented Mar. 22, 1966

3,241,591
DOME FASTENER WITH FLOATING NUT
Jose Rosan, San Juan, and Robert D. Weber, Costa Mesa,
Calif., assignors to Rosan Engineering Corp., Newport
Beach, Calif., a corporation of California
Filed July 27, 1964, Ser. No. 385,411
14 Claims. (Cl. 151—41.7)

This application is a continuation-in-part of application for U.S. Letters Patent, Serial No. 57,043, filed Sept. 19, 1960, entitled "Dome Fastener With Floating Nut," now abandoned.

This invention relates to fastener devices and more particularly to a dome-type of fastener unit including a mounting member, a nut floatingly but nonrotatably disposed in said mounting member, a retainer or sleeve for retaining the nut in the mounting member, and locking means securing the retainer in the mounting member.

In certain structures comprising sheet metal elements and a plurality of fasteners connecting the same together, it is essential that the openings in the sheets be in accurate registration. While it is possible to drill or punch fastener openings in such sheets with precision spacing, frequently it happens that upon heat treating of the sheets, the distance between the fastener openings is caused to change due to slight longitudinal and transverse shrinkage of the sheets. Consequently, it has been found that the openings in such sheets do not accurately register at the time that the parts are being assembled. The present fastener device is designed to overcome the foregoing problem resulting from misalignment of the fastener-receiving openings.

More specifically, the invention relates to a dome fastener having a self-aligning nut that is adapted to be used to secure two members together, with the dome fastener mounted in one member substantially in alignment with an opening in another member.

One of the important features of the present fastener is that the nut member in the dome or mounting member "floats," i.e., is free to move to align itself with the fastener seeking to make engagement therewith.

Another feature of the invention is that the nut retainer can readily be removed to permit replacement of the nut whenever necessary, and the retainer reinserted in the mounting member in exactly the same position it had previously occupied.

A further feature is that a blank retainer may be inserted in the mounting member and a hole drilled in the retainer in precise alignment to match an opening in a member to be secured to the part carrying the mounting member, so that the parts can be disassembled and reassembled in precise alignment.

The principal object of the invention is to provide a dome nut structure that can be permanently secured relative to an opening in a structural member, such as a metal sheet, and which dome nut structure includes an internally threaded member capable of self-alignment with a fastener for securing another member to the metal sheet.

Another object is to provide a dome nut structure having a replaceable, internally threaded member that is floatingly mounted within the housing of the dome nut, but which, nevertheless, is restrained against axial and rotary movement and is designed to provide adequate torque and pull-out values when engaged by a mating fastener.

Another object is to provide a fastener structure including a nut retainer member adapted to be drilled in precise alignment with an opening in a structural member, and wherein matching of the parts can be retained even though the nut of the fastener is removed and replaced.

A further object is to provide a dome nut structure wherein the nut member can be removed and replaced, and wherein a retainer member employed to maintain the nut in place in the mounting member can be reinserted in exactly the same angular position that it occupied before removal to afford access to the nut member.

A further object is to provide a dome nut assembly including a mounting member, a nut, and a retainer for the nut, wherein the retainer can be readily removed to permit replacement of the nut.

Other objects and features of the invention will be apparent from the following description taken in conjunction with the accompanying drawings, in which.

Referring more particularly to FIGS. 1–6, inclusive, the dome nut unit or assembly is generally identified by the numeral 23 and comprises a tubular mounting member 24, a threaded nut 25 and a nut retainer 26.

Figure 1:
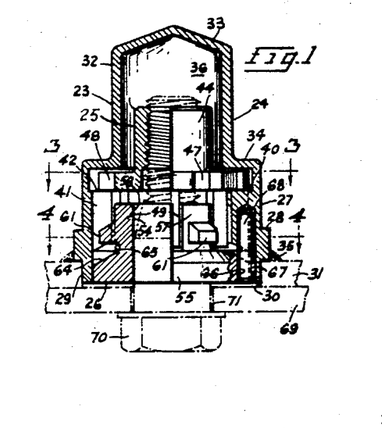
FIG. 1 is a greatly enlarged view, partly in quarter section, illustrating one embodiment of a self-aligning dome nut constructed in accordance with the principles of the present invention.

The mounting member 24 comprises a tubular body, one end 27 of which has a circular flange 28 and a cylindrical pilot portion 29 located beyond the flange 28. The outside diameter of the pilot portion 29 is such that it snugly fits within an opening 30 in a plate or other sheet metal workpiece 31, shown in dot-and-dash lines. The other end 32 of the mounting member 24 is of reduced diameter and is closed by a generally conical dome wall 33. An external shoulder 34 joins the end portions 27 and 32. The flange 28 abuts the plate 31 about the periphery of the opening 30 when the mounting member 24 is placed in position and serves as a stop to limit the entry of the end 27 into said opening, as best shown in FIG. 1. The mounting member 24 is secured to the workpiece 31, as by welding the flange 28 thereto, as indicated at 35.

The mounting member 24 has an inner chamber or bore 36 within the end 32 and a larger, outer chamber or counterbore 37 within the end portion 27, the chambers 36 and 37 being separated by an internal groove 38. The groove 38 provides an abutment shoulder 39 which is parallel to the outer surface of the shoulder 34, and a seating shoulder 40, which defines the upper end of the chamber 37.

Figure 5:
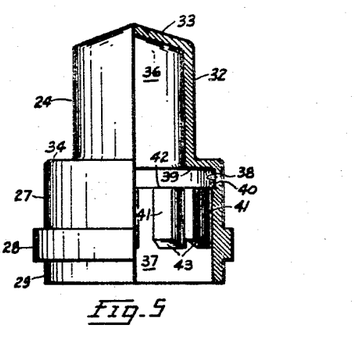
FIG. 5 is a view in quarter section of the mounting member shown in FIG. 1.
Figure 6:
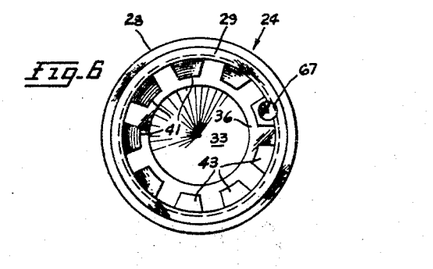
FIG. 6 is a view of the lower end of the mounting member shown in FIG. 5.

The inner wall defining the chamber 37 is provided with a plurality of axially extending splines 41 which, as shown in FIG. 5, are not co-extensive with the depth of the chamber 37, but begin at a point spaced from the lower end of the mounting member and terminate at the shoulder 40. The splines 41 have inner or upper ends 42 (FIG. 5), that form flat abutments and lie in the plane of the seating shoulder 40 so as to form a continuation of said seating shoulder 40 and extend at right angles to the longitudinal axis of the mounting member 24. The splines 41 have lower or outer ends 43 that are beveled.

It will be noted from FIG. 1 that the over-all length of the nut 25 is considerably less than the distance between the inner ends of the splines 41 and the end closure wall 33, and that the axial length of the projections 49 is considerably less than the distance between the spline ends 42 and the inner end of the pilot portion 29 of the mounting member 24.

Figure 7:
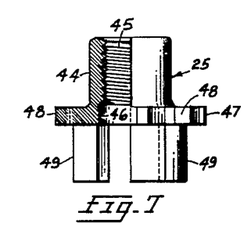
FIG. 7 is a view in substantially quarter section of the nut member shown in FIG. 1.
Figures 8, 10, 11, 12, 13, 14:
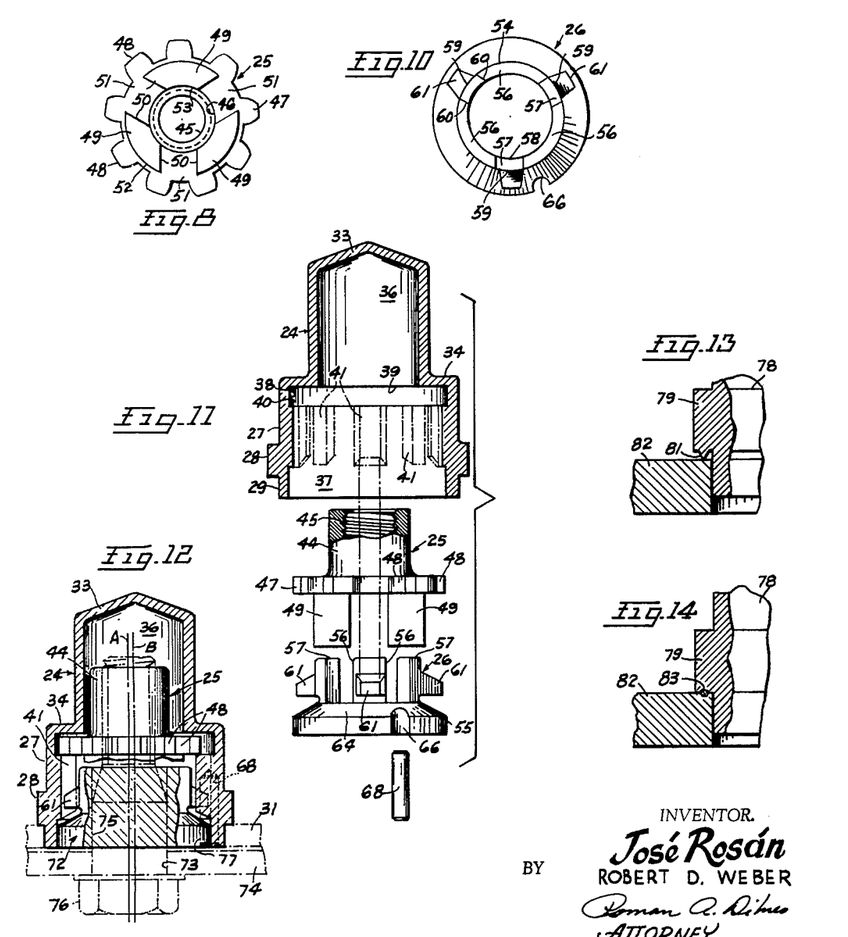
FIG. 8 is a bottom view of the nut member shown in FIG. 7.
FIG. 10 is a plan view of the nut retainer shown in FIG. 9.
FIG. 11 is a diagrammatic view illustrating the several parts of the dome nut assembly with the parts in axial alignment.
FIG. 12 is a view similar to FIG. 1, but showing the nut retainer in the form of a solid blank adapted to have a hole drilled therein in precise alignment with an opening that is to be matched in a structural member.
FIG. 13 is a fragmentary view illustrating a modified form of flange on the mounting member adapting the same for resistance welding to a sheet metal member.
FIG. 14 is a view similar to FIG. 13, but showing the flange and sheet after the welding operation has been performed.

It will also be noted from FIG. 1 that the nut 25 is loosely or floatingly retained within the mounting member 24, so that slight lateral and angular movement is permitted between these parts. A plate 69, shown in dot-and-dash lines, is adapted to be secured to the plate 31 by a fastener 70. Prior to assembly, an opening 71 in the plate 69 is aligned with the central opening in the retainer 26 to permit the fastener 70 to be inserted through the retainer 26 and into engagement with the nut 25. The counterbore 46 in the nut 25 (as best seen in FIGS. 7 and 8) is first engaged by the inner end of the fastener 70, and since the nut 25 is free to move transversely, if necessary, it will automatically align itself with the inner end of the fastener 70 to provide a self-aligning function.

As the fastener 70 is tightened, axial movement of the nut 25 is restrained by the engagement of the teeth 48 with the inner ends 42 of the splines 41, while the retainer 26 prevents rotation of the nut 25 through the interengagement of its projections 57 with the projections 49 of the nut and through the interengagement of its bosses 61 with the spaces between the splines 41.

The central bore of the nut retainer 26 may be made slightly larger than the diameter of the fastener 70 to permit slight relative play, if desired.

Figure 4:
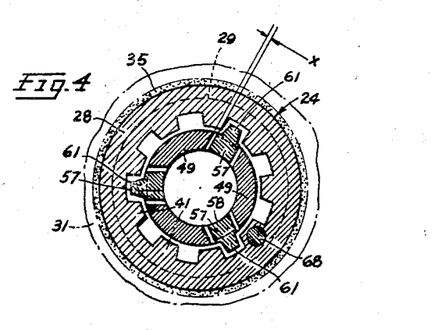
FIG. 4 is a sectional view taken on line 4—4 of FIG. 1, and particularly illustrating the vertically interlocking projections of the nut and retainer, and the horizontally interlocking bosses and splines on nut retainer and mounting member, respectively, for preventing rotary movement of the nut relative to the mounting member.

FIG. 4 illustrates the relation of the projections 49 and 57 and of the bosses 61 relative to the splines 41. Projections 49 and 57 are shown in loose association (as indicated by the dimension designated by the letter X) so that a slight amount of rotational and lateral movement is permitted. It will be understood that when the parts are in this relation, the retainer is only partially inserted into the chamber 37, because the bosses 61 on the projections 57 are stopped by contacting the beveled lower ends 43 of the splines 41. This occurs by virtue of the fact that the projections 57 carrying the bosses 61 are aligned with the spaces between the teeth 48 and the spaces 51 are radially aligned with the splines 41.

Referring to FIGS. 7 and 8, the nut 25 comprises a hollow tubular body 44 having internal threads 45 extending through a major portion of its length. The body portion 44 has a counterbore 46 in advance of the threads 45 to provide a lead for aligning the nut 25 with a fastener. The body 44 has a radial flange 47 intermediate its ends, containing a plurality of teeth 48. The maximum diameter of radial flange 47 is less than the maximum diameter of internal groove 38 thereby permitting limited lateral movement of nut 25 relative to mounting member 24. The thickness of radial flange 47 and the teeth carried thereby is slightly less than the height of annular groove 38 as defined by the abutment shoulder 39 and seating shoulder 40. Thus, as will hereinafter be explained, limited angular movement of nut 25 is permitted relative to mounting member 24 after nut 25 is rotated and seated in its operative position during the assembly of the fastener. The teeth 48 are evenly spaced and equal in number to the splines 41, for a purpose to be explained hereinafter.

The nut 25 has three projections 49 extending downwardly beyond the flange 47 of the body 44. The projections 49 are generally in the form of sectors of a circle, although the straight sides 50 thereof are not radial, but one side 50 of one projection is parallel to an adjacent side 50 of another projection to form spaces or grooves 51 between the projections. The outer arcuate surfaces 52 of the projections 49 form part of a circle having its center at the axis of the body 44. The inner arcuate surfaces 53 of the projections 49 form part of the periphery of a circle, concentric with the circle defining the outer surfaces 52, but of the same diameter as that of the counterbore 46.

In FIG. 8 (and FIG. 3) it will be noted that the mounting member 24 has a corresponding number of splines 41, as nut 25 has teeth 48, and, further, that the teeth and splines are so dimensioned that the teeth are capable of passing through the spaces between the splines. It will also be noted that the retainer member 26 has the same number of axially extending projections 57 as nut 25 has axially extending projections 49; and that the spacing and size of these projections are so designed that the projections 49 and 57 are capable of freely intermeshing vertically.

It will also be noted from FIG. 8 that the midpoint of the spaces between the teeth 48 is aligned with a radial line passing through the middle of the slots 51. The number of teeth 48 and the number of slots 51 are so chosen that no complete tooth 48 is aligned with a slot 51, for a purpose to be explained later. In the present embodiment, the ratio of the number of teeth 48 to the number of slots 51 is three-to-one.

Figure 9:
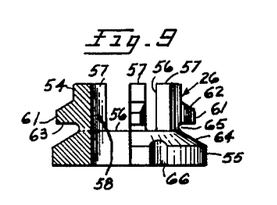
FIG. 9 is a view in substantially quarter section of the nut retainer shown in FIG. 1.
Figure 15:
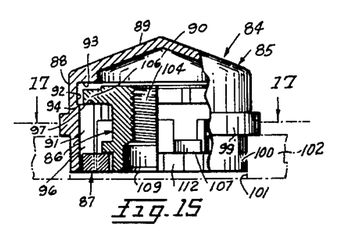
FIG. 15 is a view partly in quarter section of another embodiment of the present dome nut assembly.

The nut retainer 26 is best shown in FIGS. 9 and 10 and comprises a tubular body 54 having a lower end flange 55. The end of the body 54 opposite the end flange 55 is intersected by a plurality of arcuate notches or slots 56 which provide axially extending projections 57. The arcuate widths of projections 57 are slightly less than the arcuate widths of the spaces 51 provided by nut 25 (as best shown by dimension X in FIG. 4) so that limited lateral and rotational movement of nut 25 is permitted relative to retainer 26 and concomitantly mounting member 24. The inner arcuate walls 58 and the outer arcuate walls 59 of the projections 57 lie on concentric circles having a center coinciding with the axis of the body 54. The projections 57 have parallel side walls 60.

Each of the projections 57 carries a radial boss 61 of a shape complemental to the space between the splines 41. The upper end of each boss 61, as is shown in FIG. 9, has a beveled surface 62, and the lower end of each boss has a flat radially extending surface 63. The upper surface of the flange 55 is beveled at 64. The surfaces 63 and 64 are spaced by an annular recess 65. The periphery of the flange 55 is notched at 66 to provide a semi-circular groove. The mounting member 24 has a similar notch 67. The notches, when in registration, provide a longitudinally extending groove to receive a locking pin 68 to secure the mounting member 24 and retainer 26 together.

The manner of assembling the dome nut unit 23 is schematically shown in FIG. 11, in which the mounting member 24 appears in cross-section with its splines 41, shown in dot-and-dash lines, aligned with the spaces between the teeth 48 of the nut 25. Thus, the nut 25 can be slid vertically into the chamber 37 with the teeth 48 on the nut 25 passing between the splines 41 until the flange 47 and the teeth 48 are stopped by engagement thereof with the shoulder 39 at the upper side of the groove 38. At this time, the teeth 48 lie in the same plane as the groove 38. As aforesaid, the thickness of the teeth is slightly less than the height of the groove 38, so that slight rotational and angular movement of the nut 25 relative to the mounting member 24 is permitted. While the mounting member 24 and the nut 25 are in this position, that is, with the teeth 48 aligned with the spaces between the splines 41, the retainer 26 is inserted into the counterbore 37 so that its projections 57 intermesh with the projections 49.

Figures 2, 3:
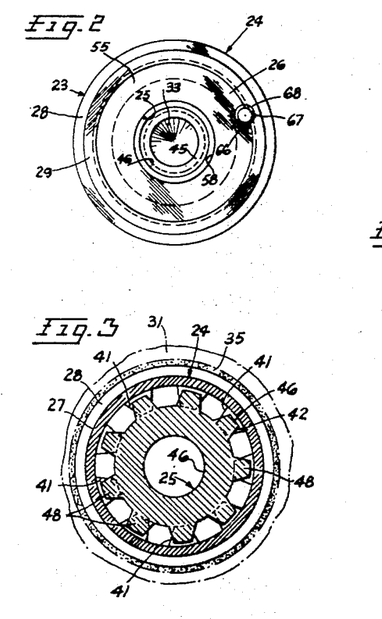
FIG. 2 is a view of the lower end of the dome nut assembly shown in FIG. 1.
FIG. 3 is a horizontal sectional view taken on line 3—3 of FIG. 1, particularly illustrating the structure of the mounting member and nut for preventing outward axial movement of the nut relative to the mounting member.

It is necessary, therefore, to slightly rotate the nut 25 and retainer 26 to permit the bosses 61 to enter spaces between two adjacent splines 41. Such rotation causes the teeth 48 of the nut 25 to assume a position in vertical alignment with the upper ends 42 of the splines 41, as shown in FIG. 3. This prevents inadvertent withdrawal of the nut 25 and also prevents any substantial axial movement of the nut 25 within the mounting member 24. The retainer 26 should be so positioned relative to the mounting member 24 that the notch 66 in the flange 55 and the notch 67 in the mounting member 24 are in registration, whereupon the locking pin 68 can be driven into the notches to prevent separation of the parts. The locking pin may be solid, as shown, or may be in the form of a spirally coiled ribbon of spring metal (not shown) which is driven into the notches to hold the retainer from dropping out and/or to maintain these parts in predetermined registration. The outer diameter of the flange 55 of the retainer 26 may be such as to provide for a drive fit of the flange 55 in the chamber 37, to further assure that the parts will remain assembled.

FIG. 12 illustrates a modified embodiment of the invention in which a solid or blank retainer 72 is shown inserted in the mounting member 24. The purpose of the blank retainer 72 is to permit accurate and precise alignment of a preformed opening 73 in a plate 74 with an opening to be drilled in the retainer, so that the openings in the retainer and plate will match perfectly. This feature is of substantial importance when the plate 74 has a series of openings 73 that must be precision-matched with a series of mounting members 24 that are assembled with the plate 31. Thus, an opening 75 (shown in dot-and-dash lines) may be drilled in the retainer 72 on an axis "A" slightly out of alignment with the axis "B" of the mounting member 24, as illustrated in FIG. 12. However, this creates no serious problem in view of the fact that the nut 25 can shift transversely within the mounting member 24 sufficiently to align itself with the axis "A" of the fastener 76.

It will be understood that in the event the nut 25 of FIG. 12 must be replaced for any reason, it is extremely important that the retainer 72, with its off-center opening 75, be reinserted in the mounting member 24 in exactly the same position that it originally occupied. This can be readily done with the present structure for the reason that the retainer 72 can be remounted in the mounting member 24 and locked in place only if the notch 77 is in registration with the corresponding notch in the mounting member 24 to permit driving of the locking pin 68 to lock the parts in assembled relation.

The retainers 26 and 72 can be readily removed from their respective mounting members by drilling out the locking pin 68.

FIG. 13 illustrates a modified mounting member 78 in which a flange 79 has a V-shaped ridge 81 formed on the underside thereof. The ridge 81 is provided in order to enable the flange 79 to be secured in place by resistance welding to the plate 82.

FIG. 14 illustrates the parts of FIG. 13 after they have been welded together, with ridge 81 having been fused with the plate 82 during the welding operation to provide a fusion weld, as indicated at 83. In this manner, the mounting member 78 is quickly, neatly, and permanently secured to the plate 82.

FIGS. 15 to 22 show a modified form of the invention in which a fastener unit 84 comprises a tubular mounting member 85, an internally threaded nut 86, and a nut retainer 87.

Figures 16, 17, 18, 20, 21, 22, 23:
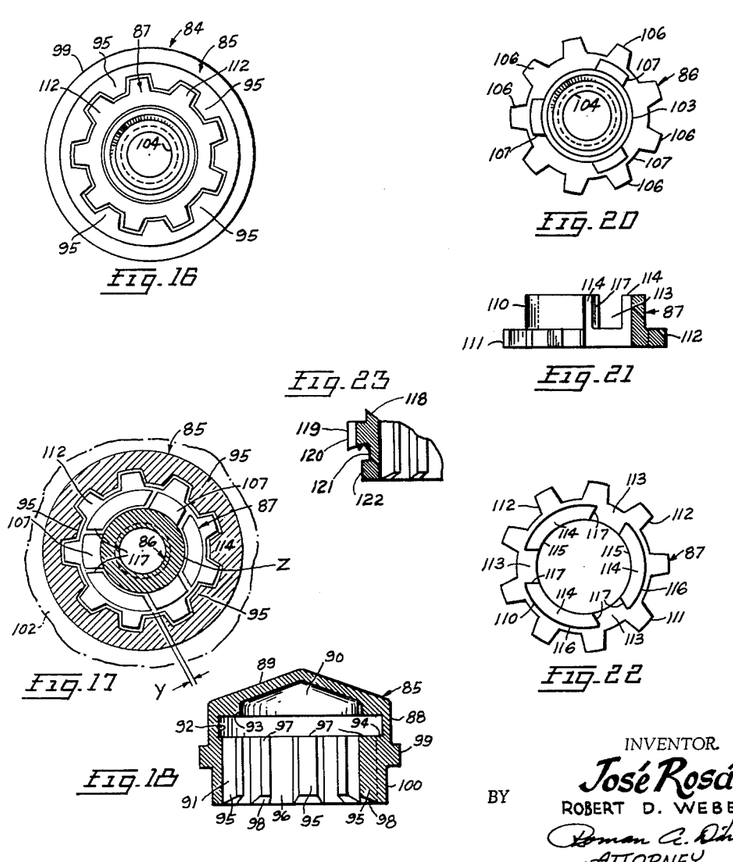
FIG. 16 is a bottom view of the dome nut assembly shown in FIG. 15.
FIG. 17 is a horizontal sectional view taken on line 17—17 of FIG. 15.
FIG. 18 is a vertical sectional view through the mounting member.
FIG. 20 is a bottom view of the nut shown in FIG. 19.
FIG. 21 is a view in quarter section of the nut retainer shown in FIGS. 15 and 16.
FIG. 22 is a plan view of the nut retainer shown in FIG. 21.
FIG. 23 is a vertical, fragmentary, sectional view, illustrating a modified form of the mounting flange adapting a press nut principle for securing the mounting member to the workpiece.
Figure 19:
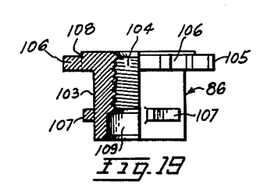
FIG. 19 is a view in quarter section of the nut shown in FIG. 15.

The mounting member 85 includes a tubular body 88, which is open at one end and closed at the other end by a dome wall 89. The body 88 includes an inner chamber 90, and an outer chamber 91 separated by a groove 92 forming annular shoulders 93 and 94. The lower chamber 91 has axially extending and radially inwardly projecting splines 95, similar to the splines 41 of the fastener unit 23 which form longitudinal grooves 96. The splines 95 do not extend the entire length of the chamber 91. Actually, the inner or upper ends 97 of the splines 95 terminate at the shoulder 94 and the outer or lower ends 98 of said splines terminate at the open end of the mounting member 85 and are beveled as best shown in FIG. 18.

A flange 99, corresponding to flange 28 of the first-described embodiment, is spaced a short distance from the open end of the tubular body 85. The portion 100 of the body 85, disposed below the flange 99, is formed with a slightly smaller outer diameter and adapted to fit within an aperture 101 of a sheet metal element 102. The flange 99 may be welded to said sheet metal element 102 by either form of weld described hereinbefore.

The nut 86 (FIGS. 15, 19 and 20) comprises a tubular body 103 having internal threads 104 through a major part of its axial length. A flange 105 spaced from the upper end of the tubular body 103 is provided with a series of circumferentially spaced teeth 106. The maximum diameter of flange 105, inclusive of teeth 106, is less than the diameter of said groove 92 thereby permitting slight lateral movement of nut 86 relative to mounting member 85. The thickness of flange 105 is less than the height of said groove 92 so as to permit limited rotational and angular movement of nut 86. A plurality of radial bosses 107 extend from the tubular body 103 at a point between the flange 105 and the lower end of the tubular body. It will be noted that each boss 107 is axially aligned with one of the teeth 106, for a purpose to be described hereinafter. The number of teeth 106 equals the number of splines 95 and the spacing of the teeth 106 and their circumferential extent. The spacing of the splines 95 and their circumferential extent are so selected and designed that the teeth and the splines can freely intermesh when assembled.

The outer diameter of the body 103, between the flange 105 and the lower end of said body, is smaller than the portion 108 of the body above flange 105. The diameter of the portion 108 is slightly less than the diameter of the chamber 90 in the mounting member 85 to allow some relative transverse movement between the nut 86 and said mounting member, when assembled. It will also be noted that the unthreaded portion of the nut body 103 is counterbored at 109 to facilitate self-alignment of the nut 86 with the entry therein of a mating screw member (not shown).

The retainer 87 (FIGS. 21 and 22), comprises a tubular body 110 having an end flange 111 with a plurality of teeth 112 thereon. Teeth 112 are adapted to engage longitudinal grooves 96 formed by splines 95 carried by mounting member 85 so as to prevent rotation of the retainer 87 relative to said mounting body 85. The body 110 includes a series of axially extending slots 113 to provide a plurality of axially extending projections 114 in said body 110 corresponding, in function, to the projections 57 of retainer 26. The arcuate widths of said slots 113 (as illustrated by dimension Y in FIG. 17), are greater than the widths of bosses 107 carried by nut 86 so as to permit limited lateral and rotational movement of said nut 86 relative to retainer 87. These projections have concentric inner and outer peripheral surfaces 115 and 116, respectively, and straight side walls 117, the side walls of one projection being parallel with the side walls of an adjacent projection.

In assembling the unit 84, the nut 86 is inserted into the open end of the mounting member 85 with end carrying flange 105 foremost, so that the teeth 106 pass through the spaces between the splines 95. The retainer 87 is then inserted into the open end of body 88, projections 114 foremost. The diameter of grooves 96 of the body 88 of the mounting member 85 is greater than the external diameter of the body 103 of the nut 86 so that limited angular and lateral movement of nut 86 relative to mounting member 85 is not prohibited (see reference "Z" of FIG. 17) when the retainer body 110 is inserted into the open end of the mounting member, the bosses 107 on the nut 86 register with the radial slots 113 between the projections 114 on the retainer 87. Since the teeth 112 on the retainer 87 are now angularly offset relative to the teeth 106 and the spaces between the splines 95, the flange 111 of the retainer 87 is stopped by the engagement of its teeth 112 with the outer ends 98 of the splines 95.

As in the previously described embodiment, it is necessary to manipulate the retainer 87 to move the nut 86 inwardly until the teeth 106 are stopped by engagement with the shoulder 93. The flange 105 is then in the plane of the groove 92. In this latter position, it is possible to give the nut 86 a slight angular twist sufficient to align the teeth 112 thereon with the spaces between the splines 95, which action concurrently turns the nut 86 a corresponding amount to align the teeth 106 thereon with the flat ends 97 of the splines 95. The retainer 87 is then forced into the chamber 91 with its teeth 112 engaged in the spaces between the splines 95, thereby locking the nut 86 against axial and rotary movement within the mounting member 85.

FIG. 23 illustrates a modified mounting member 118 in which the flange 119 is provided with axially extended serrations 120. Said mounting member 118 is further provided with annular groove 121 and annular flange 122. Mounting member 118 may thus be embedded in the workpiece by inserting annular flange 122 into the bore and applying an axial external pressure upon the insert, thereby embedding serrations 120 into the workpiece surface so as to cause a flow of the workpiece material into annular groove 121. Thus, the mounting member 118 is quickly and permanently installed to the workpiece.

In both of the above embodiments of the invention, the splines in the mounting member, the bosses and projections on the nut, and the teeth, projections and bosses on the nut retainer, comprise axial interfitting tongue and groove means for effecting nonrotational mounting of the nut in the mounting member. Simultaneously, the toothed flange on the nut coacting with the overlying abutment means provided by the mounting member and the shoulders provided by the inner ends of the splines in the mounting member comprise means to prevent axial movement of the nut. Moreover, the lock pin comprises a means to lock the retainer in the mounting member in a predetermined indexed relationship.

It will be understood that various changes may be made in the details of construction and in the arrangement of the component parts of the fastener devices disclosed herein without departing from the principles of the invention and the scope of the annexed claims.

I claim:

1. A self-aligning fastener device comprising:

a hollow mounting member having an open end and radially and inwardly extending longitudinal tongue means having shoulders at one end thereof and an internal annular groove provided by said mounting member adjacent said shoulders, said tongue means forming longitudinal grooves therebetween, said mounting member having abutment means overlying and spaced from said tongue means;

an internally threaded insert member disposed within said mounting member, said insert member having longitudinally extending tongue means and radially projecting tongue means, said radial tongue means of said insert member being adapted to be axially displaced along said longitudinal grooves provided by said mounting member and seat upon said shoulders provided at the ends of said tongue means of said mounting member so as to interfit in said annular groove, said radial tongue means of said insert member having a thickness less than the height of said annular groove and a maximum diameter across said tongue means less than the maximum diameter of said annular groove thereby permitting slight angular and lateral movement of the insert member relative to said mounting member;

a retainer member disposed in said open end to secure said insert member in said mounting member, said retainer member having groove means, said retainer member groove means being interengaged with said longitudinal tongue means of said insert member, said groove means carried by said retainer member having a width slightly greater than the width of said longitudinal tongue means carried by said insert member thereby permitting limited lateral movement of said insert member relative to said retainer member, said retainer member having tongue means interengaged with said longitudinal grooves provided by said mounting member thereby preventing rotational movement of said retainer member in said mounting member while permitting limted lateral and angular movement of the insert member for aligned reception of an externally threaded fastener.

2. A self-aligning fastener device comprising:

a hollow mounting member having an open end and radially and inwardly extending longitudinal tongue means having shoulders at one end thereof and an internal annular groove provided by said mounting member adjacent said shoulders, said tongue means forming longitudinal grooves therebetween, said mounting member having abutment means overlying and spaced from said tongue means;

an internally threaded insert member disposed within said mounting member, said insert member having longitudinal groove means and radially projecting tongue means, said insert member tongue means being adapted to be axially displaced along said longitudinal grooves provided by said mounting member and seat upon said shoulders provided at the ends of said tongue means of said mounting member so as to interfit in said annular groove, said insert member tongue means having a thickness less than the height of said annular groove and a maximum diameter across said tongue means less than the maximum diameter of said annular groove thereby permitting slight angular and lateral movement of the insert member relative to said mounting member;

a retainer member disposed in said open end to secure said insert member in said mounting member, said retainer member having tongue means, said retainer member tongue means being interengaged with said longitudinal groove means of said insert member, said tongue means carried by said retainer member having a width slightly less than the width of said groove means carried by said insert member thereby permitting limited angular and lateral movement of said insert member relative to said retainer member, said retainer member having tongue means interengaged with said longitudinal grooves provided by said mounting member thereby preventing rotational movement of said retainer member in said mounting member while permitting limited lateral and angular movement of the insert member for aligned reception of an externally threaded fastener.

3. A self-aligning fastener device as defined in claim 2, wherein the mounting member and the retainer member have matching notches and the pin is disposed in said notches to secure the mounting member and retain them together after the insert member has been rotated so as to seat upon the shoulders provided by said mounting member thereby prohibiting further rotation of the insert member relative to the mounting member.

4. A self-aligning fastener device comprising:

a tubular mounting member having an open end and an internal annular groove, one wall of said groove being defined by an overlying annular abutment shoulder and the other wall being defined by an annular seating shoulder, a plurality of tongue and groove means on said mounting member, said mounting member tongue means having shoulders which lie in the plane of said seating shoulder so as to form a continuation of said seating shoulder;

an internally threaded insert member positioned within said mounting member, said insert member having a radially projecting toothed flange, said toothed flange being accommodated in said annular groove and having an external diameter slightly less than the external diameter of said annular groove thereby permitting slight lateral movement of said insert member relative to said mounting member, said toothed flange having a thickness slightly less than the axial height of said annular groove, thereby permitting limited angular movement of said insert member relative to said mounting member, said toothed flange being engaged between said mounting member shoulders and said abutment flange thereby preventing axial movement of said insert member relative to said mounting member while permitting limited lateral and angular movement of said insert member for aligned reception of an externally threaded fastener;

a retainer member disposed in said open end;

interfitting axial tongue and groove means on said insert and retainer members, said axial tongue means provided by said insert member having a width less than the width of the interfitting groove means carried by said retainer member thereby permitting slight angular and lateral movement of said insert member relative to said retainer member, said retainer member being provided with radially extending tongue means, said radially extending tongue means being interengaged with said groove means provided by said mounting member thereby preventing rotation of said retainer member relative to said mounting member.

5. A self-aligning fastener device, comprising:

a tubular mounting member having an open end;

an internally threaded insert member loosely mounted within said mounting member for floating movement therein, said insert member having a toothed flange, said flange having a maximum diameter less than the maximum internal diameter of said mounting member thereby permitting limited lateral movement of said insert member relative to said mounting member;

a retainer member disposed in the open end of said mounting member;

interfitting longitudinal tongue and groove means on said retainer and insert members to effect substantial nonrotational mounting of said insert member within said mounting member, said groove means carried by said insert member having a width slightly greater than the width of the interfitting tongue means carried by said retainer means thereby permitting limited lateral and rotational movement of said insert member relative to said retainer member and said mounting member;

a plurality of tongue means on said mounting member having shoulders engageable with said flange teeth to prevent axial movement of said insert member in one direction, said mounting member having abutment means axially spaced from said shoulders to prevent axial movement of said insert member in the other direction, the cooperating tongue and groove means on the insert member and retainer member being relatively axially movable radial bosses carried by said retainer member interfitting with said mounting member tongue means so as to prohibit rotational movement of said retainer member relative to said mounting member;

and means to lock said retainer member in said mounting member.

6. A self-aligning fastener device, comprising:

a tubular mounting member having a bore, and a counterbore forming a stop shoulder with said bore, said counterbore being formed with a plurality of axial splines having abutment ends spaced from said stop shoulder;

an internally threaded insert member in said mounting member having a toothed flange slidably insertable in said counterbore and being rotatable so as to seat upon said abutment ends, said flange having a maximum diameter less than the maximum internal diameter of said mounting member so as to allow limited lateral and angular movement of said insert member relative to said mounting member, said insert member being provided with radial tongue means extending therefrom;

and a retainer member disposed in said mounting member having means effecting an interlocking engagement with said insert member tongue means, said means being sufficiently circumferentially spaced apart so as to be larger than the radially projecting tongue means provided by said insert member thereby prohibiting substantial rotational movement of said insert member relative to said retainer member while permitting limited lateral and angular movement of the insert member within the tubular mounting member for aligned reception of an externally threaded fastener, said retainer member being provided with radial bosses, said bosses being interengaged with said counterbore splines carried by said mounting member so as to coact therewith and prohibit rotational movement of said retainer member relative to said mounting member.

7. A self-aligning fastener device, comprising:

a tubular mounting member having a bore and a counterbore forming a stop shoulder with said bore, said counterbore being formed with a plurality of axial splines having abutment ends spaced from said stop shoulder;

an internally threaded insert member having a toothed flange mateable with said splines and slidably insertable in said counterbore up to said stop shoulder, said flange having a maximum diameter less than the maximum internal diameter of said mounting member, said insert member being provided with radial bosses extending therefrom;

and a retainer member having projections interengaging with the splines in the counterbore to prevent rotation of said retainer member relative to said mounting member, said retainer member having tongue and groove means effecting a spline engagement with said radial bosses of said insert member, said tongue and groove means being sufficiently circumferentially spaced apart so that said groove means are larger than said boss means of said retainer member thereby prohibiting substantial rotational movement, yet permitting limited lateral and angular movement of said insert member relative to said retainer member prior to engagement of said retainer projections with said counterbore splines, said retainer member being operable through said spline engagement with the insert member to rotationally shift said insert member so as to vertically align the toothed flange of said insert member thereof with the abutment ends of said axial splines and subsequent thereto after engagement of said retainer projections with said counterbore splines to prevent rotational movement of the insert member within the tubular mounting member, while permitting limited lateral and angular movement of the insert member relative to said tubular mounting member.

8. A self-aligning fastener device comprising:

a tubular mounting member having a bore and a counterbore forming a stop shoulder within said bore, said counterbore being formed with a plurality of axial splines having abutment ends spaced from said stop shoulder;

an internally threaded insert member having a toothed flange mateable with said splines and slidably insertable in said counterbore up to said stop shoulder, said flange having a maximum diameter less than the maximum internal diameter of said mounting member, said insert member being provided with radial bosses extending therefrom;

and a retainer member having means effecting a spline engagement with said radial bosses of said insert member, said means being sufficiently circumferentially spaced apart so as to be larger than the radially projecting tongue means provided by said insert member thereby prohibiting substantial rotational movement and permitting limited lateral and angular movement, said retainer member having other means effecting a spline engagement with said counterbore splines, said other means effecting said spline engagement with said counterbore splines being angularly offset relative to the teeth on said insert member flange prior to engagement of said counterbore splines with said corresponding retainer member engagement means, said retainer member being actuatable through said spline engagement with said insert member to rotationally shift said insert member to align the toothed flange thereof with the abutment ends of said counterbore splines and to thereafter effect said spline engagement with said counterbore splines so as to prevent further rotational movement of said threaded member within said tubular mounting member, while permitting limited lateral angular movement of the insert member within said tubular mounting member.

9. A self-aligning fastener device, comprising:

a hollow mounting member having an open end, said mounting member having axially extending splines and a recess above said splines;

a nut mounted for floating movement within said mounting member, said nut having radial teeth at its upper end, said teeth being accommodated in said recess, said recess having a maximum diameter greater than the maximum diameter across the radial teeth portion of said nut, said nut having a plurality of radial bosses extending therefrom in vertical alignment with certain of said nut teeth; and a retainer disposed in the open end of said mounting member, said retainer having radial teeth at its lower end disposed in the spaces between the splines of said mounting member, and having a plurality of upwardly extending circumferentially spaced projections with the spaces between said projections radially aligned with certain of the spaces between the teeth on said retainer, the bosses on said nut being disposed in the spaces between said retainer projections, said bosses having a width less than the width of said spaces whereby said retainer prevents substantial rotary movement of said nut relative to said mounting member, yet permitting limited lateral and angular movement of said nut relative to said retainer, and the teeth at the upper end of said nut cooperate with the recess above said splines in said mounting member so as to prevent axial movement of said nut relative to said mounting member while the nut may float in a plane normal to the axis of said mounting member.

10. A self-aligning fastener device comprising:

a hollow mounting member having an open end and radially and inwardly extending longitudinal tongue means having shoulders at one end thereof and an internal annular groove adjacent said shoulders, said tongue means forming longitudinal grooves therebetween, said mounting member having abutment means overlying and spaced from said tongue means;

an internally threaded insert member disposed within said mounting member, said insert member having a first radially projecting tongue means, said first radial tongue means being adapted to be axially displaced along said longitudinal grooves provided by said mounting member and seat upon said shoulders provided at the end of said tongue means of said mounting member so as to interfit in said annular groove, said first radial tongue means having a thickness less than the height of said annular groove and a maximum diameter across said tongue means less than the maximum diameter of said annular groove, thereby permitting limited angular and lateral movement of the insert member relative to said mounting member, a second radially projecting tongue means carried by said insert member, said second tongue means being axially spaced from said first tongue means;

a retainer member disposed in said open end to secure said insert member in said mounting member, said retainer member having groove means, said retainer member groove means being interengaged with said second tongue means of said insert member, the second tongue means of said insert member being circumferentially smaller in width than the groove means of said retainer member, said retainer member having tongue means interengaged with said longitudinal grooves provided by said mounting member thereby preventing rotational movement of said retainer member in said mounting member while permitting limited lateral and angular movement of the insert member for aligned reception of an externally threaded fastener.

11. A self-aligning fastener device comprising:

a hollow mounting member having an open end and radially and inwardly extending longitudinal tongue means having shoulders at one end thereof and an internal annular groove provided by said mounting member adjacent said shoulders, said tongue means forming longitudinal grooves therebetween, said mounting member having abutment means overlying and spaced from said tongue means;

an internally threaded insert member disposed within said mounting member, said insert member having a radially projecting toothed flange, said flange being adapted to be axially displaced along said longitudinal grooves provided by said mounting member and seat upon said shoulders provided at the ends of said tongue means of said mounting member so as to interfit in said annular groove, said radial flange having a thickness less than the height of said annular groove and a maximum diameter across said teeth less than the maximum diameter of said annular groove, thereby permitting limited angular and lateral movement of the insert member relative to said mounting member, said insert member being provided with radially projecting tongue means;

a retainer member disposed in said open end to secure said insert member in said mounting member, said retainer member having groove means interengaged with said radial tongue means of said insert member, said groove means carried by said retainer member having a width slightly greater than the width of said tongue means provided by said insert member, thereby permitting limited lateral movement of said insert member relative to said retainer member, said retainer member having tongue means interengaged with said longitudinal grooves provided by said mounting member thereby preventing rotational movement of said retainer member in said mounting member while permitting limited lateral and angular movement of the insert member for aligned reception of an externally threaded fastener.

12. A self-aligning fastener device comprising:

a tubular mounting member having an open end and an internal annular groove, one wall of said groove being defined by an overlying annular abutment shoulder and the other wall being defined by an annular seating shoulder, a plurality of tongue and groove means on said mounting member, said mounting member tongue means having shoulders which lie in the plane of said seating shoulder so as to form a continuation of said seating shoulder;

an internally threaded insert member positioned within said mounting member, said insert member having a radially projecting toothed flange, said toothed flange being accommodated in said annular groove and having an external diameter slightly less than the external diameter of said annular groove thereby permitting slight lateral movement of said insert member relative to said mounting member, said toothed flange having a thickness slightly less than the axial height of said annular groove, thereby permitting limited angular movement of said insert member relative to said mounting member, said toothed flange being engaged between said mounting member shoulders and said abutment flange thereby preventing axial movement of said insert member relative to said mounting member while permitting limited lateral and angular movement of said insert member for aligned reception of an externally threaded fastener, said insert member being provided with radially projecting tongue means;

a retainer member disposed in said open end, said retainer member having groove means interfitting with said radial tongue means carried by said insert member, said groove means provided by said retainer member having a width slightly greater than the width of said interfitting radial tongue means provided by said insert member, thereby permitting limited angular and lateral movement of said insert member relative to said retainer member, said retainer member being provided with a radially projecting toothed flange, said radially projecting toothed flange being interengaged with said groove means provided by said mounting member, thereby preventing rotation of said retainer member relative to said mounting member.

13. A self-aligning fastener device comprising:

a tubular mounting member having a bore and a counterbore forming a stop shoulder within said bore, said counterbore being formed with a plurality of axial splines having abutment ends spaced from said stop shoulder;

an internally threaded insert member having a toothed flange mateable with said splines and slidably insertable in said counterbore up to said stop shoulder, said toothed flange having a maximum diameter less than the maximum internal diameter of said mounting member, said insert member having radially projecting tongue means;

and a retainer member having groove means mating with said radial tongue means carried by said insert member so as to effect a spline engagement with said insert member, said groove means being sufficiently circumferentially spaced apart so as to be larger than the radial tongue means carried by said insert member thereby prohibiting substantial rotational movement and permitting limited lateral and angular movement, said retainer member having other means effecting a spline engagement with said counterbore splines, said other means effecting said spline engagement with said counterbore splines being angularly offset relative to the teeth of said insert member flange prior to engagement of said counterbore splines with said corresponding retainer member engagement means, said retainer member being actuatable through the spline engagement with the insert member to rotationally shift said insert member to align the toothed flange thereof with the abutment ends of the counterbore splines, and to thereafter effect said spline engagement with said counterbore splines so as to prevent further rotational movement of the threaded member within the tubular mounting member, while permitting limited lateral and angular movement of the insert member within said tubular mounting member.

14. A self-aligning fastener device comprising:

a tubular mounting member having a bore, and a counterbore forming a stop shoulder with said bore, said counterbore being formed with a plurality of axial splines having abutment ends spaced from said stop shoulder;

an internally threaded insert member in said mounting member having a toothed flange slidably insertable in said counterbore and being rotatable so as to seat upon said abutment ends, said flange having a maximum diameter less than the maximum internal diameter of said mounting member and having a thickness less than the axial space between said stop shoulder and said spline abutment ends thereby permitting limited lateral and angular movement of said insert member relative to said mounting member, said insert member being provided with radially projecting tongue means;

and a retainer member disposed in said mounting member having means effecting an interlocking engagement with said insert member tongue means, said means being sufficiently circumferentially spaced apart so as to be larger than the radially projecting tongue means provided by said insert member thereby prohibiting substantial rotational movement of said insert member relative to said retainer member while permitting limited lateral and angular movement of the insert member within the tubular mounting member for aligned reception of an externally threaded fastener, said retainer member being provided with a radial toothed flange, said radial toothed flange being interengaged with said counterbore splines carried by said mounting member so as to coact therewith and prohibit rotational movement of said retainer member relative to said mounting member.

References Cited by the Examiner

UNITED STATES PATENTS

| | | | |
|---|---|---|---|
| 980,677 | 1/1911 | Rhoads | 285—86 |
| 2,164,382 | 7/1939 | Burke. | |
| 2,877,817 | 3/1959 | Rockwell. | |
| 2,972,367 | 2/1961 | Wootton | 151—69 |

EDWARD C. ALLEN, *Primary Examiner.*